United States Patent
Mori et al.

(10) Patent No.: US 6,729,201 B2
(45) Date of Patent: May 4, 2004

(54) TRACTION DRIVE SPEED REDUCER, CONVEYANCE APPARATUS USING TRACTION DRIVE SPEED REDUCER, AND ARRANGEMENT OF TWO-AXIS OUTPUT ENCODER IN CONVEYANCE APPARATUS

(75) Inventors: Hiroki Mori, Mie (JP); Tetsuya Watanabe, Mie (JP); Chohei Okuno, Mie (JP); Takahiro Maekawa, Mie (JP)

(73) Assignee: Teijin Seiki Co., Ltd., Tokyo (JP)

( * ) Notice: Subject to any disclaimer, the term of this patent is extended or adjusted under 35 U.S.C. 154(b) by 0 days.

(21) Appl. No.: 09/901,859

(22) Filed: Jul. 10, 2001

(65) Prior Publication Data

US 2002/0002869 A1 Jan. 10, 2002

(30) Foreign Application Priority Data

Jul. 10, 2000 (JP) .................................. P2000-209005
Aug. 22, 2000 (JP) .................................. P2000-251607
Sep. 14, 2000 (JP) .................................. P2000-280763

(51) Int. Cl.$^7$ .............................................. B25J 17/00
(52) U.S. Cl. ................................ 74/490.01; 74/490.07
(58) Field of Search ................... 74/490.01, 490.03, 74/490.07, 421 A, 413, 414; 901/19, 20, 23, 25, 46, 47

(56) References Cited

U.S. PATENT DOCUMENTS

| | | | | |
|---|---|---|---|---|
| 2,027,592 A | * | 1/1936 | Hoffman | 416/170 R |
| 2,252,967 A | * | 8/1941 | Forton | 74/413 |
| 3,844,179 A | * | 10/1974 | Hawley | 118/324 |
| 3,973,448 A | * | 8/1976 | Michelsen | 74/413 |
| 4,730,788 A | * | 3/1988 | Metcalf et al. | 244/50 |
| 4,780,047 A | * | 10/1988 | Holt et al. | 414/730 |
| 5,203,748 A | * | 4/1993 | Sawada et al. | 475/183 |
| 5,355,743 A | * | 10/1994 | Tesar | 475/149 |
| 5,725,352 A | * | 3/1998 | Tanaka | 414/744.5 |
| 5,872,892 A | * | 2/1999 | Brown et al. | 700/245 |
| 5,881,604 A | * | 3/1999 | Miwa | 74/490.03 |
| 6,062,099 A | * | 5/2000 | Suwa et al. | 74/490.01 |
| 6,105,454 A | * | 8/2000 | Bacchi et al. | 414/744.5 |
| 6,213,906 B1 | * | 4/2001 | Codatto | 475/178 |
| 6,276,892 B1 | * | 8/2001 | Haraguchi et al. | 414/744.5 |
| 6,363,808 B1 | * | 4/2002 | Wakabayashi et al. | 310/112 |

FOREIGN PATENT DOCUMENTS

| | | |
|---|---|---|
| DE | 199 51 988 A1 | 6/2000 |
| FR | 2 682 647 A1 | 4/1993 |
| JP | 58-119746 A | 7/1983 |
| JP | 3-281183 A | 12/1991 |
| JP | 8-506771 A | 7/1996 |

OTHER PUBLICATIONS

Unique Planetary Reducer, *Machine Design*, vol. 37, No. 10, pp. 198–199 (Apr. 29, 1965), Cleveland, U.S.A.

* cited by examiner

Primary Examiner—David Fenstermacher
(74) Attorney, Agent, or Firm—Akin Gump Strauss Hauer & Feld, L.L.P.

(57) ABSTRACT

A traction drive speed reducer which comprises circumscribed axes 20A and 20B, a plurality of intermediate axes 30A and 30B arranged contacting around the outer periphery of the circumscribed axes, and inscribed cylinders 40A and 40B inscribing the outer periphery of the intermediate axes, and in which a supporting member 10 to rotatably support the intermediate axes is fixed, a drive motor is connected to at least one of the plurality of intermediate axes, and an output is taken from the circumscribed axis having the larger diameter than the outer diameter of the intermediate axis.

15 Claims, 12 Drawing Sheets

TRACTION DRIVE SPEED REDUCER, CONVEYANCE APPARATUS USING TRACTION DRIVE SPEED REDUCER, AND ARRANGEMENT OF TWO-AXIS OUTPUT ENCODER IN CONVEYANCE APPARATUS

BACKGROUND OF THE INVENTION

1. Field of the Invention

The present invention relates to a traction drive speed reducer including a circumscribed axis, a plurality of intermediate axes arranged contacting around the outer periphery of the circumscribed axis, and an inscribed cylinder inscribing the outer periphery of the intermediate axis.

The present invention also relates to a conveyance apparatus using, as a drive apparatus, a traction drive speed reducer including a circumscribed axis, a plurality of intermediate axes arranged contacting around the outer periphery of the circumscribed axis, and an inscribed cylinder inscribing the outer periphery of the intermediate axes.

The present invention also relates to an arrangement of the 2-axis output encoder in an conveyance apparatus.

2. Related Art (1) In a traction drive speed reducer including a circumscribed axis, a plurality of intermediate axes arranged contacting around the outer periphery of the circumscribed axis, and an inscribed cylinder inscribing the outer periphery of the intermediate axes, the traction drive speed reducer in which the rotation of the drive motor is inputted into the circumscribed axis, and the intermediate axes is rotatably supported by the supporting member, and the output is taken from the supporting member, is well known (for example, JP-A-58-119746).

However, in the conventionally well known traction drive speed reducer, when there is a dispersion in the diameter of a plurality of intermediate axes, the rotation center of the supporting member from which the output is taken out can not corresponds with the center of the circumscribed axis. Therefore, the nonuniformity of the rotation occurs in the output taken from the supporting member, which is disadvantageous.

That is, in the conventional traction drive speed reducer, the rotation force from the drive motor is inputted into the circumscribed axis, in contrast to that, the output is taken from the supporting member supporting the intermediate axes. In this case, when the center of the inscribed cylinder is dislocated due to the dispersion of the diameter of a plurality of intermediate axes, the rotation center of the output is rotated around the original rotation center with the radius corresponding to the dislocated amount, therefore, the rotation of the output side causes the variation due to the dislocation of the rotation center.

Accordingly, an object of the present invention is to provide a traction drive speed reducer free from the aforementioned problem.

(2) In a field in which a fine processing inhibiting a particle, such as in a semiconductor wafer, or LCD (liquid crystal display) glass base, is necessary, the conveyed material can not be conveyed (can not hold) by chucking (grasp the conveyed material). Therefore, as the handling method in such the conveyance field, it is the present condition that the conveyance is conducted by a conveyance apparatus of a system in which the conveyed material is only put (only supported) on the hand (end effector) section.

However, in such the conveyance apparatus, in the support, there are an organic (such as the rubber, or the like) support, and an inorganic (ceramic, or the like) support, and there is a problem that, although the organic support has the comparatively large frictional force, it can not be used in the high temperature portion. Further, there is a vacuum absorption system, however, although it can be used in the air, it can not be used in the vacuum which is desirably used at the time of processing of the semiconductor wafer, or the LCD (liquid crystal display) glass base. Further, in the vacuum absorption method, the structure is complicated and the cost is high.

Accordingly, in many cases, the conveyed material (wafer, or the like) is held only by the frictional force with the hand support section. However, when such the conveyed material is suddenly moved, or moved while being vibrated, the conveyed material is slid and dislocation is caused, and the disadvantages such as the generation of the particle positioning failure, and the damage of the conveyed material, occur. Therefore, for the conveyance apparatus used in such the accurate conveyance field, the conveyance apparatus by which the conveyance with the extremely small vibration (acceleration) can be conducted (smooth conveyance), is required.

In such the conveyance apparatus in which the particle is inhibited and the fine processing is necessary, such as the semiconductor wafer or LCD (liquid crystal display) glass base, conventionally the direct drive (DD) system drive apparatus is used (JP-A-3-281183). However, in the DD system drive apparatus, because the output density (torque/volume, torque/motor capacity) is small, there is a problem that the drive apparatus is large, and the power source capacity becomes also large.

On the one hand, in order to aim at the compactification of the drive apparatus, there is also a conveyance apparatus using a speed reducer having a gear mechanism. By using the speed reducer having the gear mechanism, the compactification of the drive apparatus can be possible. However, because the gear is provided, there is a problem that the backlash exists, or vibration or noise is generated. Further, in order to reduce the vibration or noise, in the conveyance apparatus using the speed reducer having the gear mechanism, the control becomes complicated, and the cost is high.

Accordingly, another object of the present invention is to provide a conveyance apparatus by which the problems accompanied to the above conventional technology can be solved, and by which the traction drive speed reducer is used for the drive apparatus, and a compact and low vibration•low noise conveyance apparatus by which the semiconductor wafer or LCD (liquid crystal display) glass base is processed.

(3) In the conveyance apparatus used in a field which inhibits a particle and requires an accurate processing, such as a semiconductor wafer or LCD (liquid crystal display) glass base, it is well-known that an optical encoder is arranged in the vacuum (for example, JP-W-8-506771 (U.S. Pat. No. 5,720,590)).

In the conveyance apparatus disclosed in this JP-W-8-506771, because an encoder or bearing is provided in the vacuum atmosphere, the use of the high cost encoder or bearing for the vacuum atmosphere specification is necessary. Further, because the bearing is used in the vacuum atmosphere, when the load capacity is desired to be increased, it is a cause of the particle generation, therefore, there is a problem that the load capacity can not be increased.

Accordingly, yet another object of the present invention is to provide an arrangement of a 2-axis output encoder in a simply structured conveyance apparatus.

SUMMARY OF THE INVENTION

According to a first aspect of the invention, the problems accompanied to the conventional art is solved by a traction drive speed reducer which comprises a circumscribed axis, a plurality of intermediate axes arranged contacting around the outer periphery of the circumscribed axis, and an inscribed cylinder inscribing the outer periphery of the intermediate axes, wherein a supporting member to rotatably support the intermediate axes is fixed, a drive motor is connected to at least one of the plurality of intermediate axes, and an output is taken from the circumscribed axis having the larger diameter than the outer diameter of the intermediate axis.

In the present invention, the rotation is inputted into the intermediate axis, and the output is taken from the circumscribed axis located at the center. That is, the output axis which is the circumscribed axis, is set at the rotation center of the reference output, and the supporting member is fixed. According to this structure, even when there is the dispersion of the diameter in a plurality of intermediate axes, because the inscribed cylinder which is a free condition, allows the deformation due to the dispersion of the diameter of the intermediate axes, its rotation center is simultaneously dislocated. As the result, the variation of the rotation due to dispersion of the diameter of a plurality of intermediate axes is not generated in the circumscribed axis as the output axis.

Further, the present invention can be applied also in the case where a plurality of coaxial outputs are necessary. That is, when a traction drive speed reducer is structured in such a manner that, in a traction drive speed reducer which comprises a circumscribed axis, a plurality of intermediate axes arranged around the outer periphery of the circumscribed axis, and an inscribed cylinder inscribing the outer periphery of the intermediate axes, the traction drive speed reducer is characterized in that: more than two circumscribed axes are arranged coaxially; respective plurality of intermediate axes are arranged contacting around the outer periphery of respective circumscribed axes; a supporting member to rotatably support the respective intermediate axes is fixed; and the rotation is respectively inputted into at least one of paired intermediate axes, and the output is taken from the corresponding circumscribed axes, and more than two coaxial outputs can be taken out, then, the output without rotation variation can be taken from coaxial output axes. Particularly, the traction drive speed reducer having such the output axes has the very excellent characteristics, for example, as the drive mechanism of the drive section of the industrial robot.

According to a second aspect of the present invention, an conveyance apparatus which is comprising a drive motor, a drive arm driven by the drive motor, and a conveyance table connected to a top end of the drive arm, wherein an output from the drive motor is transmitted to the drive arm through a traction drive speed reducer comprising the circumscribed axis, a plurality of intermediate axes arranged around the outer periphery of the circumscribed axis, and an inscribed cylinder inscribing the outer periphery of the intermediate axes, is provided.

According to the conveyance apparatus of the present invention, the drive apparatus can be compact, and by using a traction drive system in which the speed reducer has no gear, the drive can be smooth and the vibration or noise can be reduced, and the conveyance can be conducted without generating the dislocation of the conveyed material. Because, by using the traction drive speed reducer, there is no backlash (play), and there is no impact due to the play at the time of the drive start, thereby, the dislocation of the conveyed material is not caused.

In the present invention, the conveyance apparatus can be made to be an apparatus having two coaxially arranged output axes, wherein each output axis is connected to a corresponding drive motor through the traction drive speed reducer comprising the circumscribed axis, a plurality of intermediate axes arranged around the outer periphery of the circumscribed axis, and inscribed cylinder inscribing the outer periphery of the intermediate axes, and two coaxial outputs can be taken from the two coaxial output axes.

In this case, two coaxially arranged output axes of the conveyance apparatus and an output member of the traction drive speed reducer may be integrally connected with each other, or may be connected through a transmission member such as an endless belt.

The traction drive speed reducer may fix a carrier which rotatably supports a plurality of inter mediate axes, and input the rotation from at least one of paired intermediate axes, and take out the output from the corresponding circumscribed axis, or it may input the rotation from the circumscribed axis and fix an inscribed cylinder which is inscribed by the plurality of the intermediate axes, and take out the rotation output from the carrier which rotatably supports the plurality of intermediate axes.

Further, when the conveyance apparatus of the present invention is structured in such a manner that the front stage speed reducer is connected with the front stage of the traction drive speed reducer, wherein the front stage speed reducer is constructed by the traction drive speed reducer comprising the circumscribed axis, a plurality of intermediate axes arranged around the outer periphery of the circumscribed axis, and inscribed cylinder inscribing the outer periphery of the intermediate axes, the speed reduction ratio is further increased, and there is no backlash (play), thereby, there is no impact due to the play at the start of the drive, and it is more preferable in order that the dislocation of the conveyed material may not be caused.

Further, in the present invention, the conveyance apparatus may be characterized in that the position detector is provided on the output side of the traction drive speed reducer. In the traction drive system, in its structure, it is considered that the minute slide is caused inside the traction drive. Therefore, when it is structured such that the position detector is provided on the output side, even when the slide is caused in the traction drive speed reducer, the rotation position of the output side can be detected by the position detector, thereby it can be appropriately recovered and corrected.

Further, in the present invention, it is preferable that the conveyance apparatus is characterized in that an interference is set by making the sum of the outer diameter of the circumscribed axis and two times of the outer diameter of the intermediate axis, to be not smaller than the inner diameter of the inscribed cylinder, and the torque adjusting function is provided by the interference. In the present invention, the traction drive speed reducer is used, and even when the arm of the conveyance apparatus collides with any material by any possibility, because it can be avoided by generating a slide, the conveyance apparatus is not damaged as in the case of the speed reducer using the gear. Further, when the position detector is provided as described above, it can be easily restored. In addition to that, as described above, by structuring such that an interference is set by making the sum of the outer diameter of the circumscribed axis and two times of the outer diameter of the intermediate axis, to be not smaller than the inner diameter of the inscribed cylinder, because the torque can be adjusted by the interference, thereby, the anti-collision load can be easily set.

According to a third aspect of the invention, the above object is attained by structuring the system in such a manner that, in a conveyance apparatus for conveying a material to be conveyed by driving motors which are connected to each of output axes which are two coaxial axes of an inner axis and a hollow outer axis, and which are independently driven, an arrangement of 2-axis output encoder in the conveyance apparatus is characterized in that: axis seals exist between the inner axis and the outer axis, and between the outer axis and a cylindrical housing; a traction drive speed reducer structured by the drive motors and circumscribed axes, intermediate axes and inscribed cylinders, and for speed-reducing the rotation of the drive motor, is arranged on the air side; and position detectors of the inner axis penetrate through the speed reducer, and position detectors of the outer axis are arranged among the axis seal and the speed reducers, and provided on the air side.

The present invention is a conveyance apparatus which is particularly made to be a coaxial two-axis arrangement. Because the output axis encoder, in the case of a magnetic type, has a possibility that a mis-operation is caused due to frictional powders (iron powders) generated from the speed reducer, it can not be arranged in oil (the same atmosphere as the speed reducer). Thereby, the output axis encoder should be arranged in the air and oil-less atmosphere. However, in the coaxial two-axis, the two-axis can not be arranged in the same position. This is because it is necessary that the receiving sensor is arranged on the fixed portion, however, particularly on the inner axis side output axis, there is the outer axis output axis (rotation axis) and further also the speed reducer in the outside, therefore, there is no fixing position. According to this problem, it is necessary that the axis of the inner axis side encoder is necessarily extended to the opposite direction to the output side, and extended to the fixed position, however, normally, on the reversal side of the output side, there is the speed reducer or motor, and when it is made to be hollow and penetrated, the structure also becomes complicated, thereby, the drive apparatus cannot also be compact. (The encoder should be arranged below the motor.) In contrast to this, as in the present invention, when the traction drive structure is applied, the first stage traction drive and the motor can be arranged to be offset, and the first stage traction drive and the motor and the inner axis side output encoder can be arranged in parallel to each other. Thereby, the compactification can be obtained. In this connection, in this case, as described in the second aspect, the inner axis drive motor and the outer axis drive motor are parallelly arranged, and the inner axis position detector is positioned above the lower end surface of both drive motors, that is, in the arrangement space of both drive motors. Further, the first stage traction drive may be appropriately neglected.

As described above, it is problem for the durability or the instrument cost that the output axis encoder is arranged in the vacuum atmosphere. Particularly, in the case of the magnetic type, because the sensor side cannot endure the vacuum atmosphere, it can not be arranged in the vacuum. In contrast to this, in the present invention, because the position detector is arranged in the air side, and further, it is provided out of the oil lubrication portion of the speed reducer, the two-axis output encoder in the conveyance apparatus can be low costly and easily arranged.

In the present invention, it is preferable that the position detector of the inner axis and the outer axis is made to be the magnetic type. The cost of the magnetic type position detector is lower than that of the optical type position detector.

The present disclosure relates to the subject matter contained in Japanese patent application Nos. 2000-2090005 (filed on Jul. 10, 2000), 2000–251607 (filed on Aug. 22, 2000) and 2000-280763 (filed on Sep. 14, 2000), which are expressly incorporated herein by reference in their entirety.

BRIEF DESCRIPTION OF THE DRAWINGS

FIG. 1 shows a first embodiment of the present invention, wherein

FIG. 2 shows a second embodiment according to the present invention, wherein

FIG. 4 shows a fourth embodiment according to the present invention, wherein

FIG. 5 shows an embodiment of a conveyance apparatus, wherein

FIG. 7 is a sectional view of the embodiment shown in FIG. 6, wherein

FIG. 8 is a sectional view of the embodiment shown in FIG. 6.

FIG. 9 shows yet another embodiment of a conveyance apparatus, wherein

DESCRIPTION OF THE PREFERRED EMBODIMENT

Figure 1A:
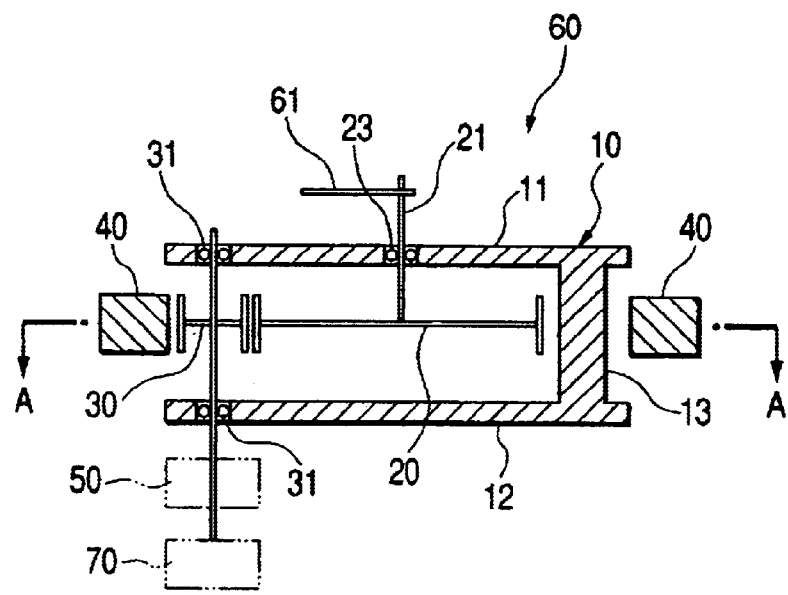
FIG. 1A is a sectional view typically showing the structure of the embodiment.
Figure 1B:
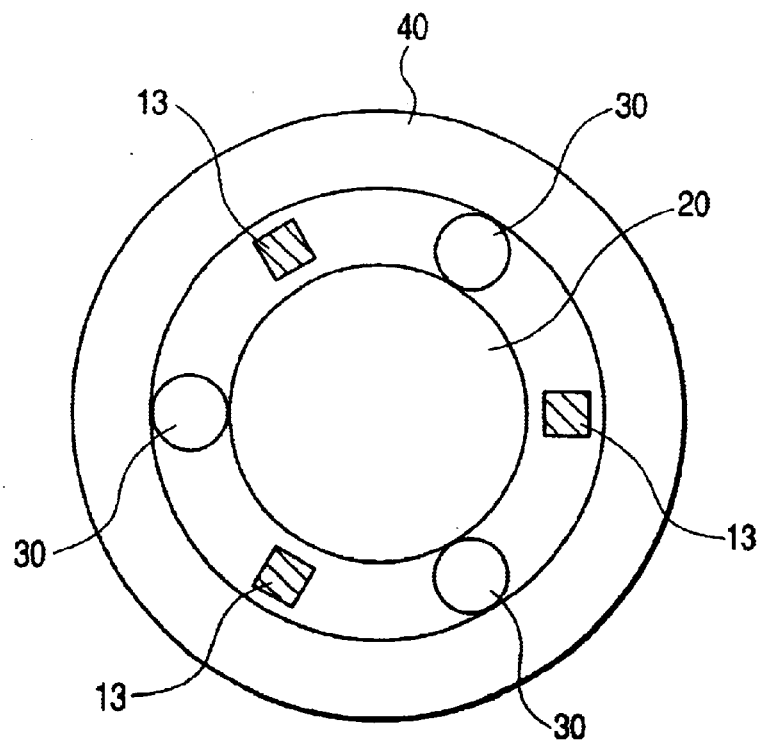
FIG. 1B is a sectional view along an A—A line of FIG. 1A.

Referring to the attached drawings, the present invention will be detailed below. FIG. 1 is the first embodiment of a conveyance apparatus 60 using the traction drive speed reducer according to the present invention, and FIG. 1A is an outline sectional view typically showing the structure of the embodiment, and FIG. 1B is a sectional view along A—A line of FIG. 1A. In this connection, although the circumscribed axis, intermediate axes, and inscribed cylinder are practically in contact with each other, in FIG. 1A, in order to clearly show the drawing, it is shown by forming the minute gaps among them. Further, in FIG. 1B, a drawing of the carrier is neglected.

In the present embodiment, as shown in FIG. 1A, a carrier 10 of the present invention is formed into a box-like by upper and lower plates 11 and 12, and a column portion 13 connecting between them. An output axis 21 is protrudingly provided at the center of an output circumscribed axis or friction gear 20, and the output axis 21 of the output circumscribed axis or friction gear 20 is rotatably supported by a bearing 23 positioned at the central portion of the upper plate 11 of the carrier 10. At an upper end of the output axis 21, an arm 61 of the conveyance apparatus 60 is provided.

A plurality of (three in the shown embodiment) intermediate axes or friction gears 30 are equally arranged as shown in FIG. 1B around the circumscribed axis or friction gear 20, and are in contact with the outer periphery of the circumscribed axis or friction gear 20. The circumscribed axis or friction gear 20 has a larger diameter than an outer diameter of the intermediate axis or friction gear 30, and as will be described later, the input introduced into the intermediate axis or friction gear 30 is decelerated, and outputted from the circumscribed axis or friction gear 20. The circumscribed axis or friction gear 20 and intermediate axes or friction gears 30 and like axes, gears and/or friction gears of the present invention are referred throughout the remainder of the specification as axes. That is, the words, "axis" or "axes" are used throughout the remainder of the specification to describe friction/traction gears or gears with no teeth that transmit rotational motion through surface contact with an adjacent toothless surface or toothless gear at a peripheral surface.

An inner periphery of an inscribed cylinder 40 inscribes the outside of a plurality of intermediate axes 30. Both ends of each of intermediate axes 30 are rotatably supported by bearings 31 provided in the upper and lower plates 11 and 12 constituting the carrier 10. As described above, the traction drive speed reducer is structured.

A dive motor 70 is connected to at least one of the plurality of intermediate axes 30, and the drive force is introduced in the intermediate axes 30. On the one hand, in the present embodiment, the carrier 10 is in a fixed condition, and the output is taken from the circumscribed axis 20. In this connection, as the modified mode of the present embodiment, the inscribed cylinder 40 is fixed, and the input is introduced from the circumscribed axis 20, and the output can also be taken from the carrier 10.

Further, in order to further increase the reduction ratio of the conveyance apparatus 60, another speed reducer 50 may be further provided on the front stage of the input axis of the traction drive speed reducer, that is, in the embodiment shown in FIG. 1, between the intermediate axes 30 and the drive motor, or in the above modified embodiment, between the circumscribed axis 20 and the drive motor. This front stage speed reducer 50 may also be a traction drive speed reducer.

Figure 2A:
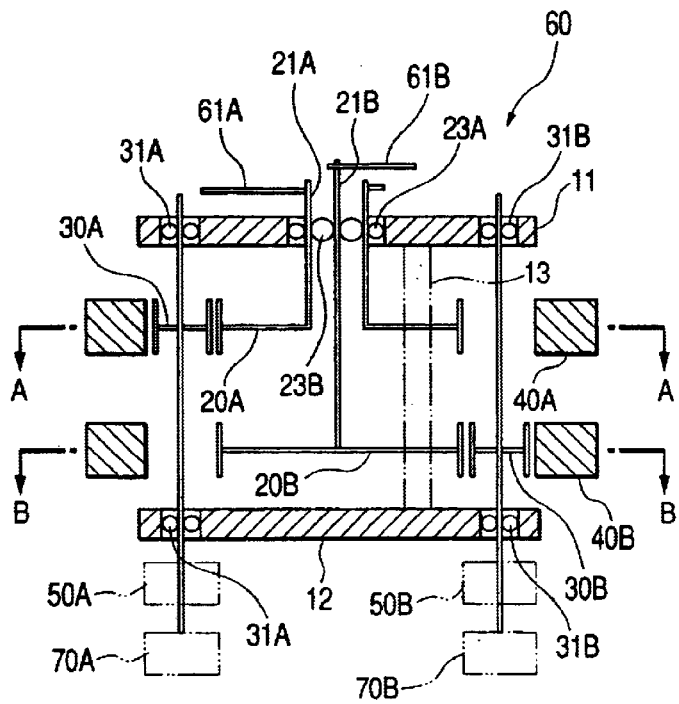
FIG. 2A shows an outline sectional view.

Next, referring to FIG. 2, the second embodiment by which a plurality of outputs are coaxially taken out, of the conveyance apparatus 60 using the traction drive speed reducer according to the present invention will be described. FIG. 2 shows the second embodiment according to the present invention, and FIG. 2A is an outline sectional view, and FIG. 2B is a sectional view of the A position inn FIG. 2A, and FIG. 2C is a sectional view of the B position in FIG. 2A.

The carrier 10 constructed by a pair of upper and lower plates 11 and 12 is connected by a column portion 13, and formed into a strong box-like condition. In the central portion of the carrier 10, an output circumscribed axis 20A having a hollow output axis 21A and an output circumscribed axis 20B having an output axis 21B which penetrates through the hollow output portion of the output circumscribed axis 20A, are coaxially positioned. On the upper ends of the hollow output axis 21A and output axis 21B, arm portions (the first arm 61A and the second arm 61B) of the conveyance apparatus 60 are respectively fitted.

Figure 6A:
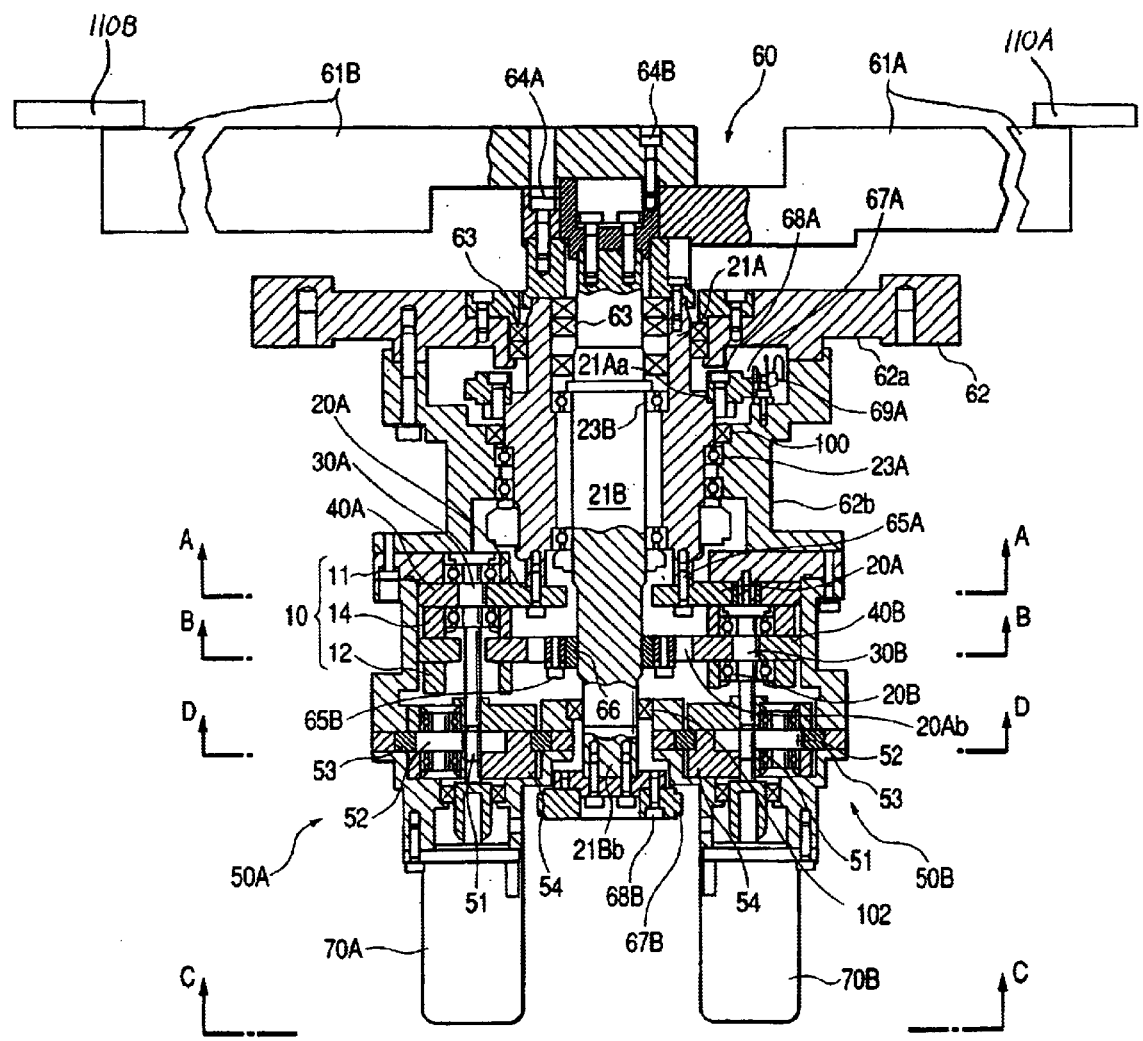
FIG. 6A is a sectional view of another embodiment of the conveyance apparatus according to the present invention.
Figure 9A:
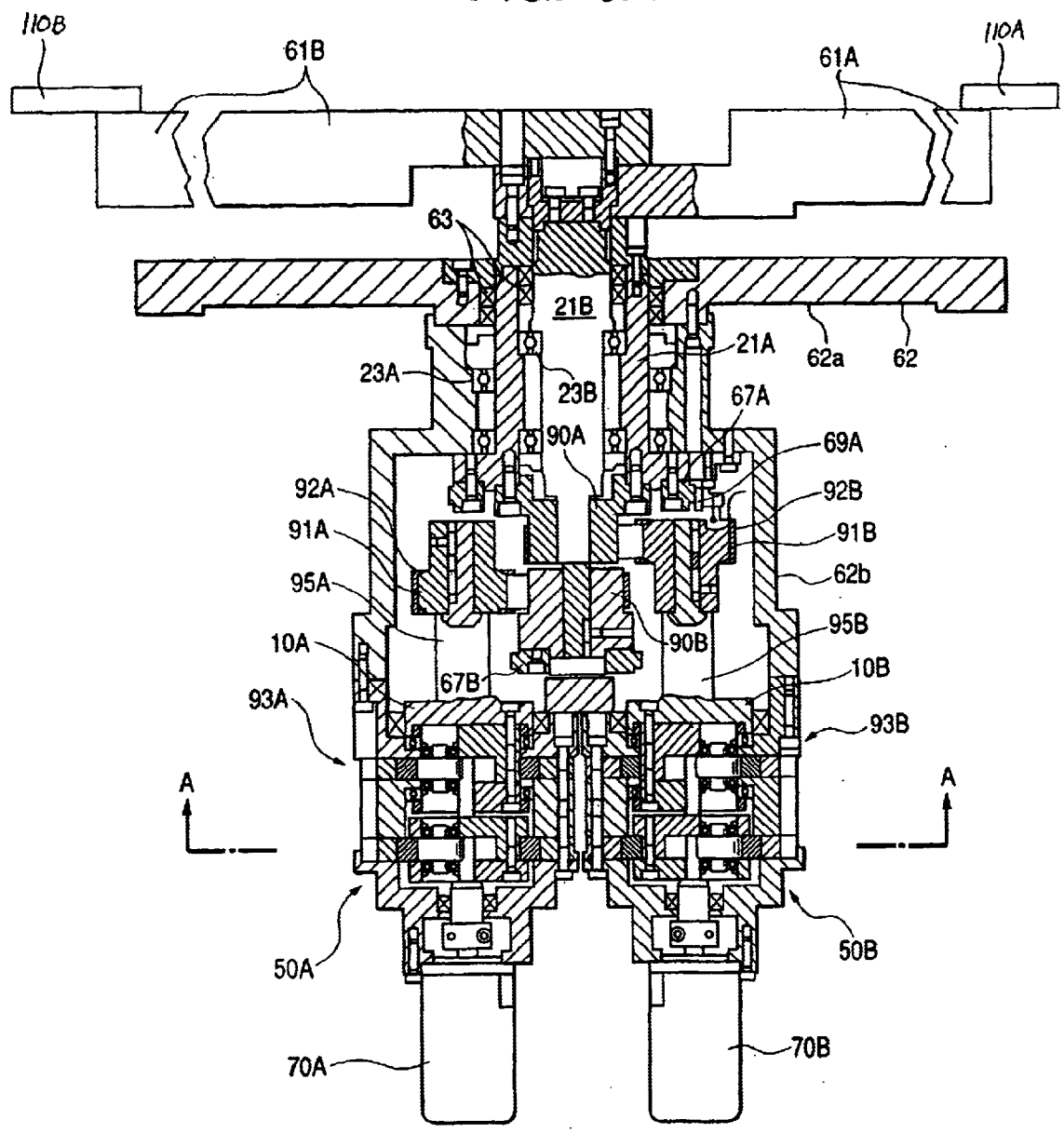
FIG. 9A is a longitudinal sectional view and FIG. 9B is an A—A sectional view of FIG. 9A.

Referring to FIGS. 6A and 9A, a first and second conveyance table 110A, 110B may be connected to a distal end or front end of the first and second drive arms 61A, 61B.

Figure 2B:
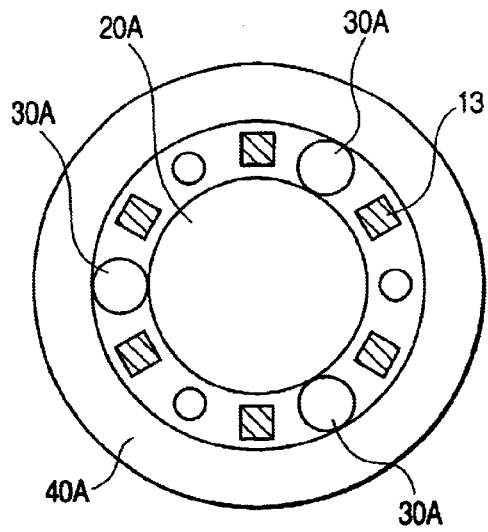
FIG. 2B shows a sectional view of an A position in FIG. 2A.
Figure 2C:
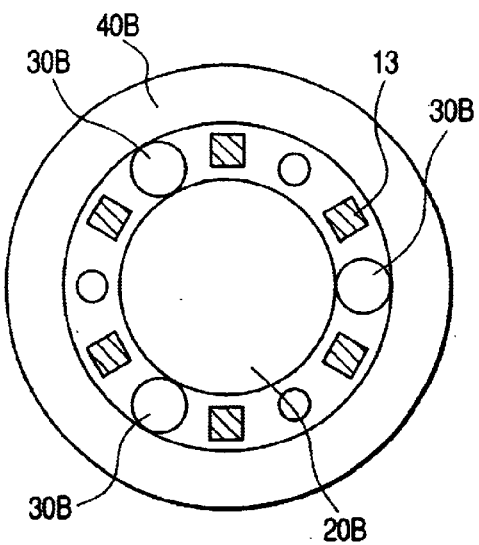
FIG. 2C shows a sectional view of the B position in FIG. 2A.

Around each of output circumscribed axes 20A and 20B, as shown in FIG. 2B and FIG. 2C, the plurality of intermediate axes 30A and 30B are located, and respectively in contact with the outer periphery of the output circumscribed axes 20A and 20B. In this connection, both ends of the intermediate axes 30A and 30B, as shown in FIG. 2A, are rotatably supported by the bearings 31A and 31B in the carrier 10.

Inscribed cylinders 40A and 40B are provided outside respective intermediate axis 30, and the inner peripheral surfaces of the inscribed cylinders 40A and 40B are in contact with the outside of the intermediate axes 30A and 30B. These are grouped by respectively paired circumscribed axes 20A and 20B, the plurality of intermediate axes 30a and 30B, and inscribed cylinders 40A and 40B, and in the present embodiment, output axes 21A and 21B of two paired speed reducers are coaxially arranged. As described above, the traction drive speed reducer is structured.

For example, drive motors 70A and 70B are connected to at least one axis of respectively grouped intermediate axes 30A and 30B, and the rotation input is introduced. Further, the carrier 10 is fixedly supported.

Thereby, the motive power inputted from the intermediate axes 30A and 30B is decelerated, and can be respectively taken from the output axes 21A and 21B. In this connection, in order to further increase the speed deduction ratio, at the front stage of the input axis of respective speed reducer, that is, between the intermediate axes 30A, 30B and the drive motors 70A and 70B, other front stage speed reducers 50A and 50B maybe further provided. Even in the case of such the large speed reduction ratio, according to the present invention, the planar arrangement can be adopted.

Figure 3:
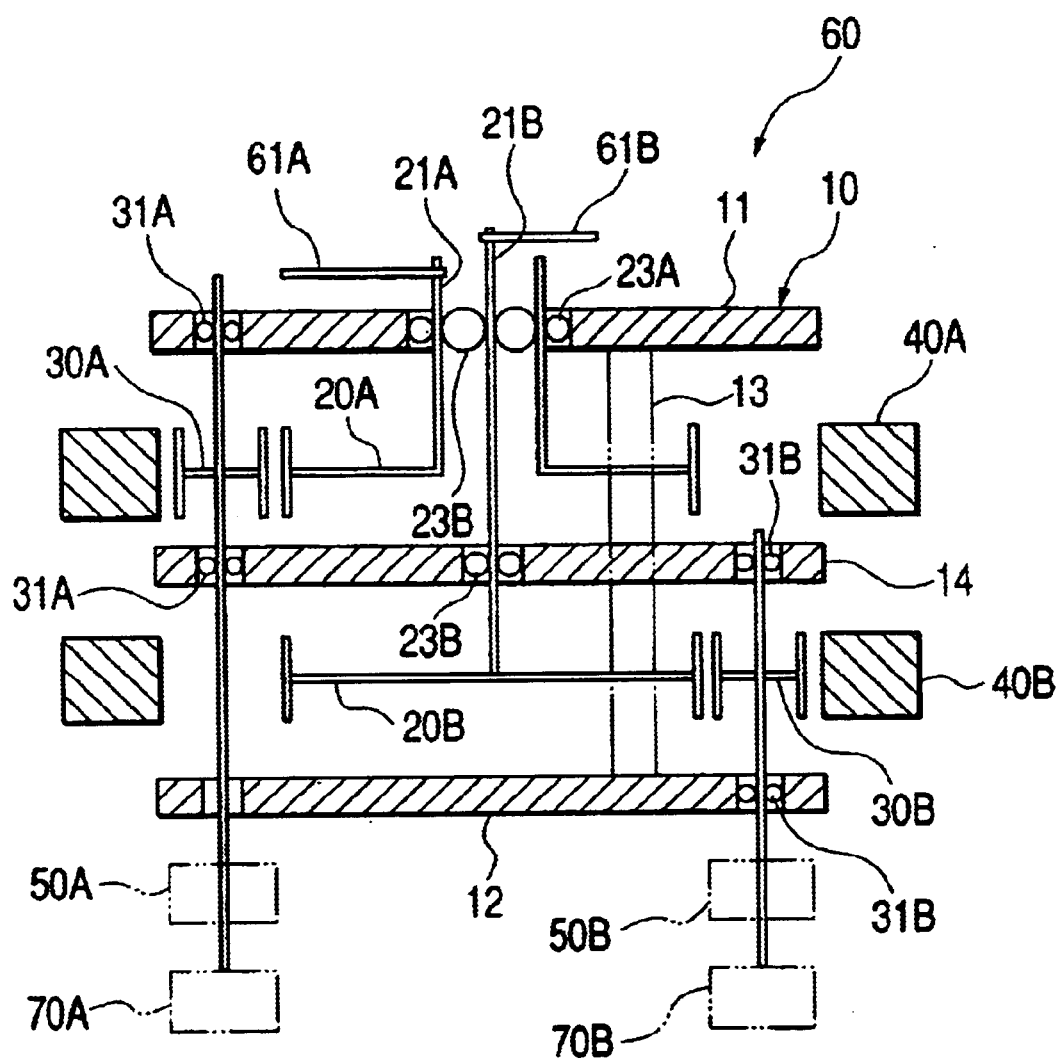
FIG. 3 shows a third embodiment according to the present invention, and is an outline sectional view similar to FIG. 2A.
Figure 4A:
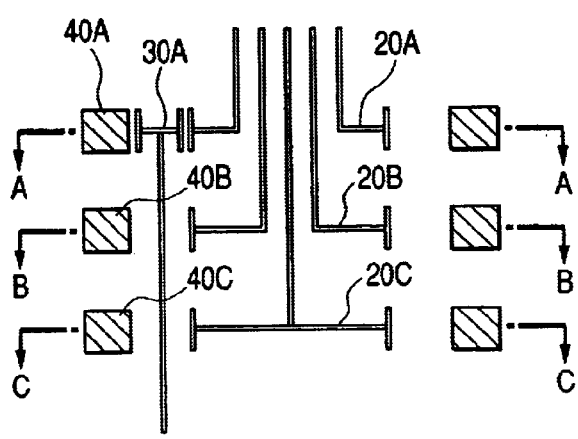
FIG. 4A is an outline sectional view.
Figure 4C:
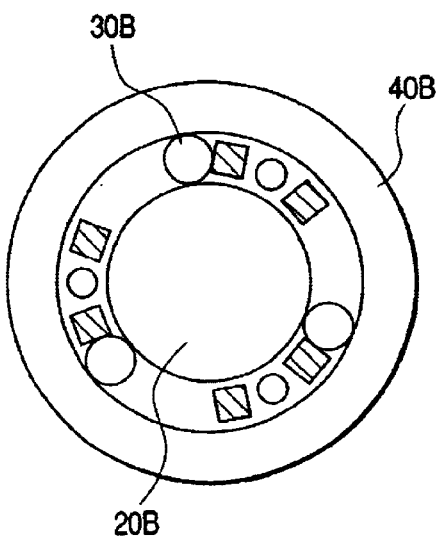
FIG. 4C shows a section of the position B in FIG. 4A.
Figure 4B:
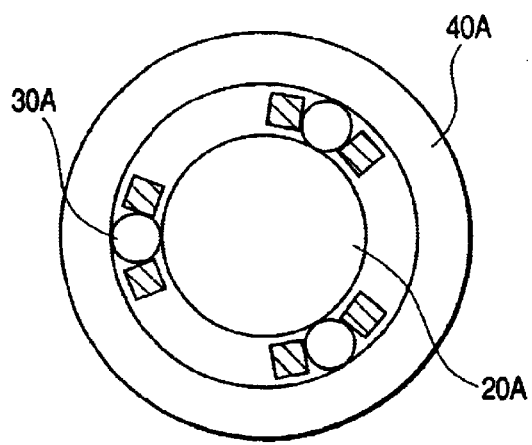
FIG. 4B shows a section of the position A in FIG. 4A.
Figure 4D:
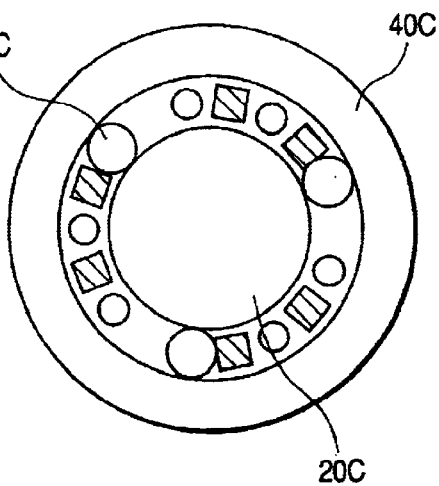
FIG. 4D shows a section of the position C in FIG. 4A.

The third embodiment of the conveyance apparatus using the traction drive speed reducer according to the present invention will be shown in FIG. 3. In the embodiment shown in FIG. 2, the intermediate axes 30A, 30B and circumscribed axes 20A and 20B are respectively supported by the carrier 10 constructed by a pair of the upper and lower plates 11 and 12, however, when there is an anxiety that the distance between the upper and lower carriers 10 becomes long, the embodiment as shown in FIG. 3 is preferable. In this embodiment, further one plate 14 is sandwiched between groups of respectively grouped circumscribed axes 20A, 20B, intermediate axes 30A, 30B, and inscribed cylinders 40A, 40B, and the carrier 10 is structured by three plates.

According to such the structure, the distance between the bearings 31A, 31A and 31B, 31B supporting the intermediate axes 30A, 30B can be reduced, thereby, the deformation of respective intermediate axes 30A and 30B can be reduced. Further, also for the circumscribed axes 20A and 20B, the both side support can be applied by the bearings 23B by which particularly the inside inscribed axis 20B is provided in plates 11 and 14, thereby, the deformation can be more reduced.

In the above embodiment, the output axes 21, 21A, and 21B are one axis or two axes, however, in the structure of the present invention, the present invention can also be applied for even the case where further large number of output axes 21 are provided. One example of that case is shown in FIG. 4. In this connection, in FIG. 4, a carrier 10 is omitted.

In the present embodiment, the circumscribed axis 20 which is the output axis 21 has the triple structure, and the second hollow cylinder exists in the outermost hollow cylinder, and further one intermediate axis 30 is penetrated through the hollow cylinder. The other structures are similar to ones shown in FIG. 2 or FIG. 3, therefore, the detailed description will be omitted.

According to the present invention, even when there are dispersions in the diameter of a plurality of intermediate axes 30, because the output is taken from the circumscribed axis 20, the variation of the rotation of the circumscribed axis 20 hardly occurs, thereby, the a good speed reducer which has no nonuniform rotation but the uniform rotation can be obtained. Accordingly, the much effective speed reducer can be obtained for an apparatus in which the variation of the rotation of the output becomes a problem.

Figure 5A:
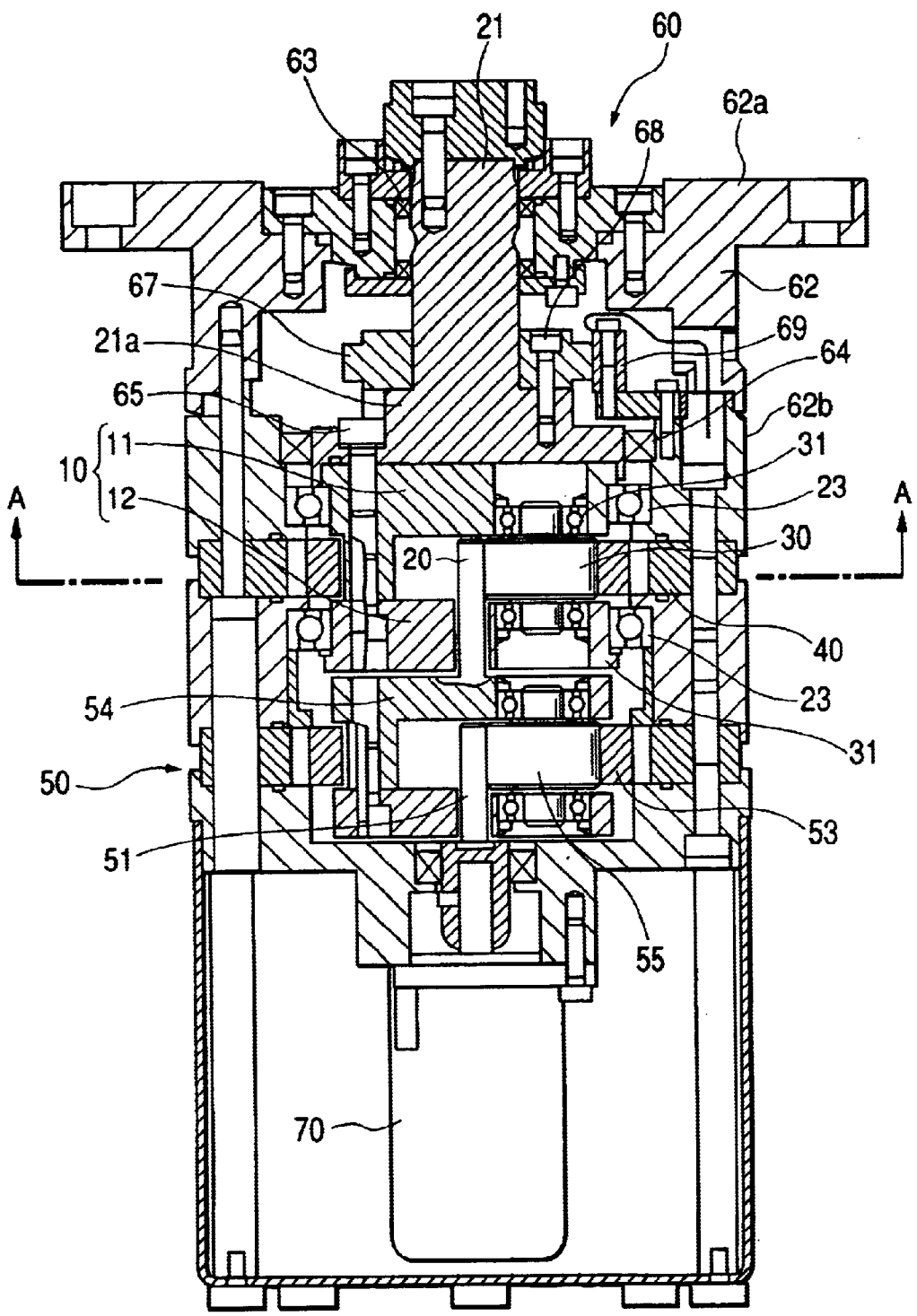
FIG. 5A is a longitudinal sectional view and FIG. 5B is an A—A sectional view of FIG. 5A.
Figure 5B:
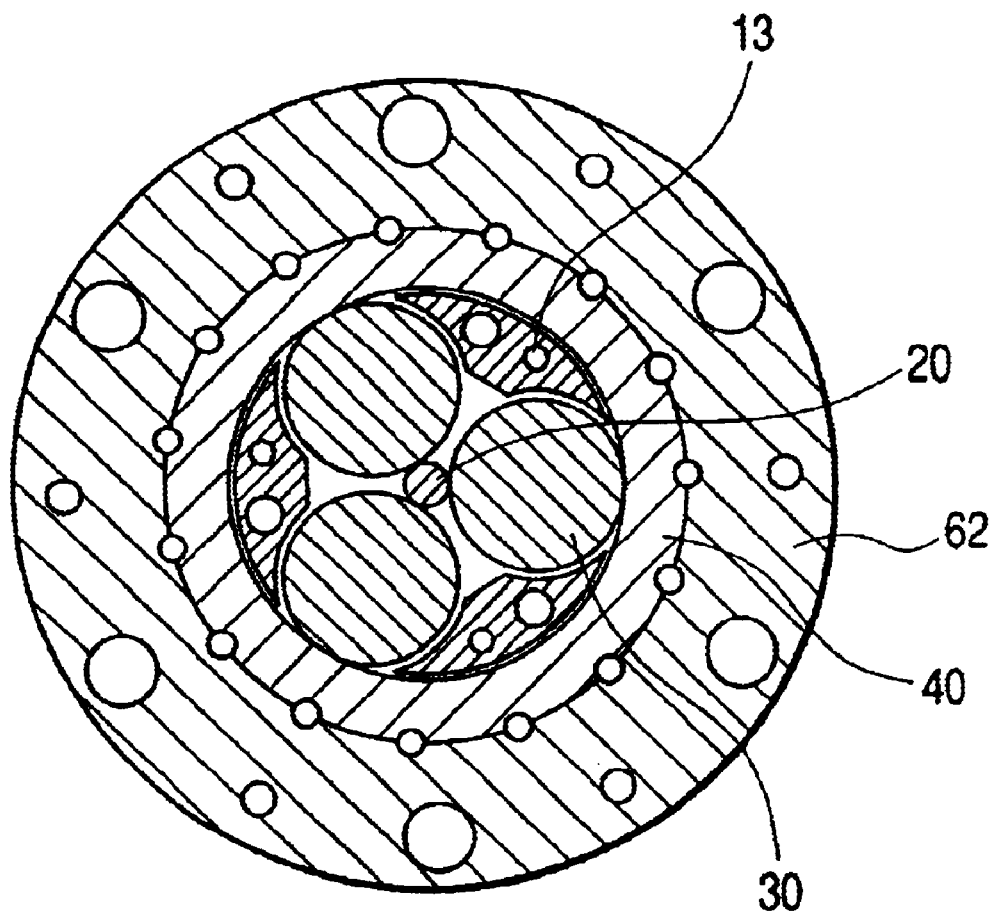

Next, referring to FIG. 5, a more specific embodiment of the conveyance apparatus 60 using the traction drive speed reducer according to the present invention will be described. FIG. 5 shows the embodiment in which the conveyance apparatus 60 using the traction drive speed reducer of the type, as shown in FIG. 1, in which the inscribed cylinder is fixed and the input is inputted from the circumscribed axis and the output is taken from the carrier, is more specified, and FIG. 5A is a longitudinal sectional view, and FIG. 5B is an A—A sectional view of FIG. 5A.

The arm (not shown) of the conveyance apparatus 60 is provided in an inside of a processing room in which the semiconductor wafer or LCD (liquid crystal display) glass base are processed, such as a clean room, and the inside of the processing room is depressurized, (so-called in a condition of the vacuum), and it is structured in such a manner that the drive apparatus to drive the arm is provided outside the processing room, and its boundary is a plate-shaped portion 62a of the head portion of a conveyance apparatus attachment mount 62. The conveyance apparatus attachment mount 62 is structured by the plate-shape portion 62a of the head portion, and the cylinder portion 62b which is integrally attached with the plate-shape portion 62a and protruded to the lower side.

The bearing 23 is provided in the cylinder portion 62b of the conveyance apparatus attachment mount 62, and the output axis 21 is rotatably supported by the bearing 23. Onto the upper end of the output axis 21, the arm (not shown) of the conveyance apparatus 60 to handle the semiconductor wafer or LCD (liquid crystal display) glass base is attached.

The carrier 10 of the traction dive speed reducer according to the present invention is formed into box-like by a pair of upper and lower plates 11, 12 and the column portion 13 connecting between them, and the carrier 10 (upper plate 11, lower plate 12 and column portion 13) is integrally attached by a bolt 65 to the lower end portion of the output axis 21.

As shown in FIG. 5A, the bearings 31 are provided in the upper and lower plates 11 and 12, and both ends of the intermediate axis 30 is rotatably supported by the bearings 31. Further, the rotatable circumscribed axis 20 penetrates through the hole positioned at the center of the lower plate 12, ans a plurality of (in the embodiment shown in the drawing, three axes) intermediate axes 30 are, as shown in FIG. 5B, equally arranged on the periphery of the circumscribed axis 20, and in contact with the outer periphery of the circumscribed axis 20. The intermediate axis 30 has the larger diameter than the outer diameter of the circumscribed axis 20. The inscribed cylinder 40 is fixedly arranged in the inside of the cylinder portion 62b of the conveyance apparatus attachment mount 62, and the inner periphery of the inscribed cylinder 40 inscribes the outside of the plurality of intermediate axes 30.

According to the above description, the inscribed cylinder 40 is fixed, and the traction drive speed reducer in which the input is inputted from the circumscribed axis 20 and the output is taken from the carrier 10, is structured, and the rotation of the drive motor 70 is decelerated, and the output axis 21 integrally attached to the carrier 10 is driven, and the arm (not shown) of the conveyance apparatus 60 attached onto the upper end of the output axis 21 is activated.

In this connection, in the gap between the inside of the upper output axis 21 of the bearing 23 and the inside of the cylinder portion 62 of the conveyance apparatus attachment mount 62, and the gap between an opening portion formed at the center of the plate-like portion 62a of the conveyance apparatus attachment mount 62 and the inside of the output axis 21, a axis seal 63 constructed by a non-contact type seal such as a magnetic fluid seal, or contact type seal is provided, and the vacuum of the inside of the processing room is maintained. Further, numeral 64 is an oil seal in order that the oil may not leak from the traction dive speed reducer side.

On the output axis 21, a shoulder portion 21a is formed in the lower portion of the axis seal 63 (that is, the outside of the vacuum processing room) and on the upper portion of the bearing 23, and on the shoulder portion 21a, a code plate 67 of a donut plate-shape outside axis position detector is fixed by a bolt 68. Further, a detecting portion 69 is provided inside the cylinder portion 62b of the conveyance apparatus attachment mount 62, and the code of the code plate 67 is detected, and the rotation position of the output axis 21 is detected.

Further, in order to further increase the speed reduction ratio of the conveyance apparatus 60, on the front stage of the input axis of the traction drive speed reducer, that is, between the circumscribed axis 20 and the drive motor 70, another front stage speed reducer 50 is further provided. The front stage speed reducer 50 of the present embodiment has the same structure as the above traction drive speed reducer, and is the traction drive speed reducer of the type in which the inner cylinder 53 is fixed, and the rotation of the drive motor 70 is inputted from the circumscribed axis 51, and the output is taken from the carrier 54, and the carrier 54 supports many intermediate axes 55 circumscribing the circumscribed axis 51, and the circumscribed axis 51 is connected to the output axis of the drive motor 70, and integrally connects the above traction drive speed reducer circumscribed axis 20 to the carrier 54.

In the conveyance apparatus 60 of the present embodiment structured as described above, the motive power inputted from the drive motor 70 is decelerated by the front stage speed reducer 50, and the output is inputted into the circumscribed axis 20 for the output axis 21 drive. Then, the inputted rotation is decelerated by the first stage traction drive sped reducer, and rotates the output axis 21, and drives the arm 61 attached to the output axis 21.

According to the conveyance apparatus of the present embodiment, the following effects can be attained. In the present embodiment, for the speed reducing mechanism of the drive apparatus, the traction system (rolling transmission) having no gear, or friction system (friction transmission by nonmetal) is used, and can be used for conveying the conveyed material such as the wafer without a slip (dislocation), and further, because the traction system has no backlash (play) as can be seen in the gear mechanism, there is no impact due to the play at the start of the drive, and causes no slip (dislocation) for the conveyed material. Accordingly, the compactness, very low vibration, and low noise can be attained.

Further, in the traction system, because the speed reducer has no gear, conventionally it is considered to be inappropriate for the high accurate positioning, however, in the above embodiment, by providing encoders (the code plate 67 and the detecting portion 69 of the detector) on the output axis 21, the problem that it is inappropriate for the high accurate positioning, is solved.

Further, in the conveyance apparatus of the present embodiment, the axis seal 63 constructed by the non-contact type seal such as the magnetic fluid seal or contact type seal, is provided on the upper portion of the bearing 23, and the vacuum in the processing room is maintained, thereby, it can be used both in the vacuum and the air.

Further, in the case of conveyance apparatus 60 having the seed reducer, because it is mechanically connected from the input to the output, even when the collision occurs due to any cause at the time of conveyance, when it is within the upper limit torque of the motor, it tries to continue the movement, thereby, there is a possibility that the conveyed material or the conveyance apparatus 60 is damaged, and in the worst case, the person may be nipped and injured. In contrast to that, in the conveyance apparatus of the present invention, because the speed reducer having the traction system has no gear, when the torque larger than a predetermined value, is activated, because the slip phenomenon is caused inside the traction drive, the impact due to the collision can be absorbed. Further, even when the position dislocation is caused by the slip, as described above, because the encoder is provided on the output side, it can also easily return to the original condition (return to the original point).

Figure 6B:
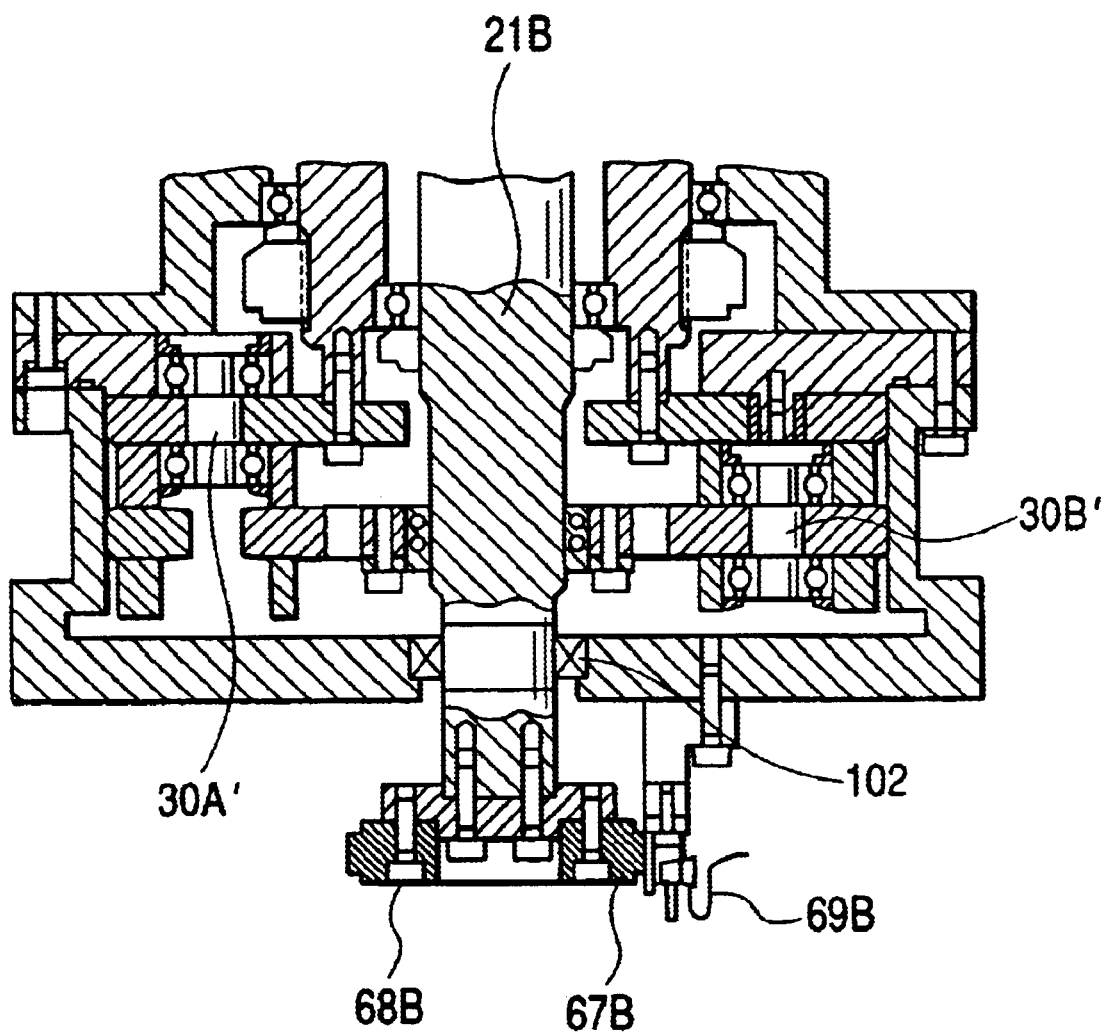
FIG. 6B is a partial view showing a detector portion of the inner axis position detector attached to the lower end portion of the solid output axis (inner axis) of the embodiment shown in FIG. 6A.
Figure 7A:
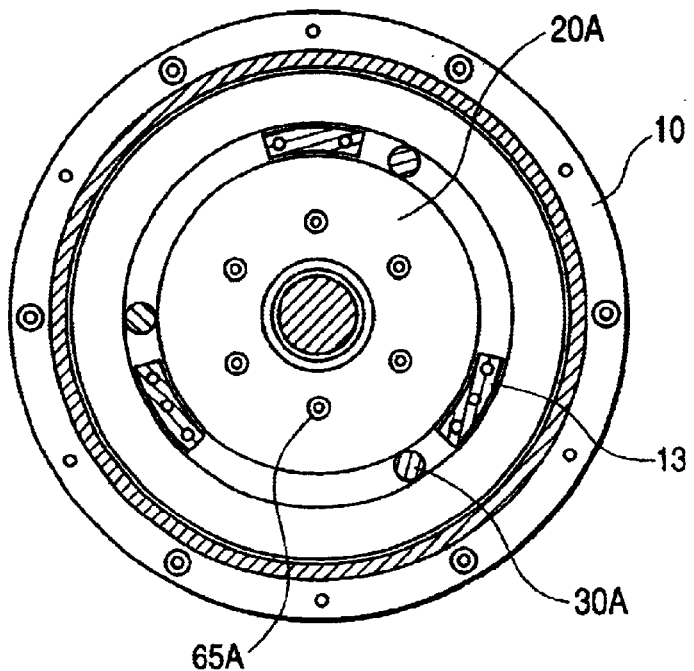
FIG. 7A is an A—A sectional view of FIG. 6A.
Figure 7B:
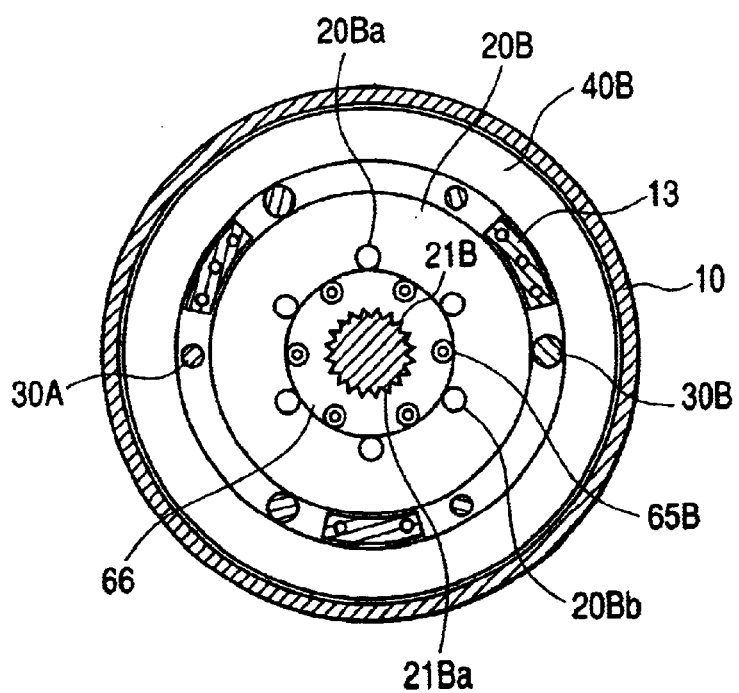
FIG. 7B is a B—B sectional view of FIG. 6A.
Figure 8A:
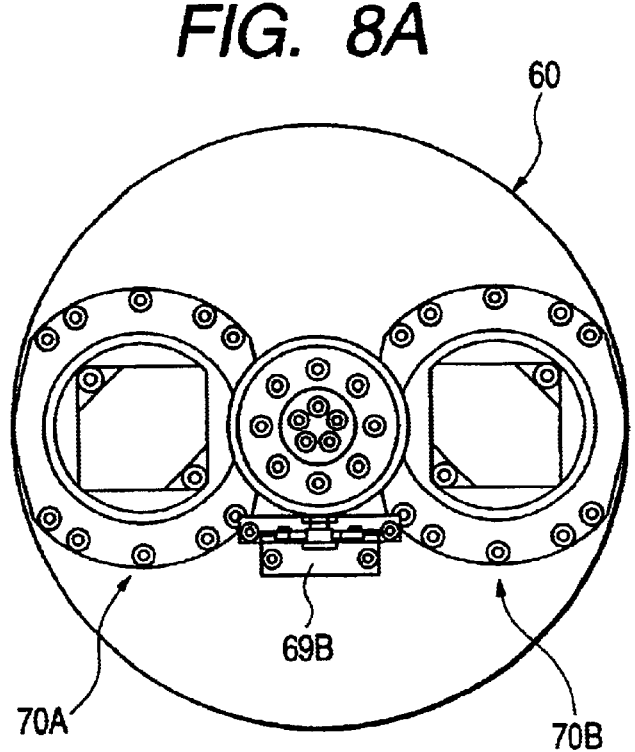
FIG. 8A is a C—C arrowed view of FIG. 6A.
Figure 8B:
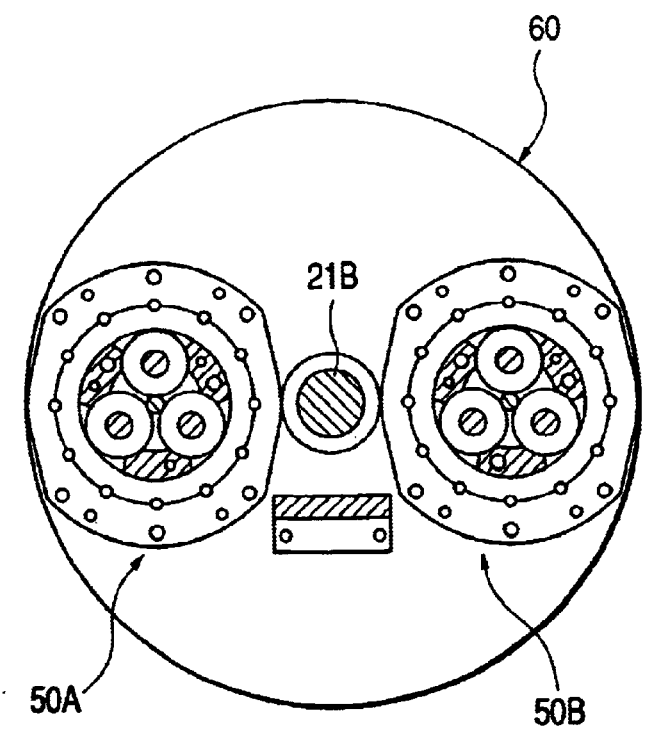
FIG. 8B is a D—D sectional view of FIG. 6A.

Referring to FIG. 6 to FIG. 8, an embodiment of the present invention will be detailed below. FIG. 6 is a sectional view showing the embodiment of the conveyance apparatus 60 using the traction drive speed reducer, and FIG. 7A is an A—A sectional view of FIG. 6 and FIG. 7B is a B—B sectional view of FIG. 6, FIG. 8A is a C—C arrowed view of FIG. 6, and FIG. 8B is a D—D sectional view of FIG. 6.

An arm portion (the first arm 61A and the second arm 61B) of the conveyance apparatus 60 is provided inside a processing room such as a clean room, to process the semiconductor wafer or LCD (liquid crystal display) glass base, and the inside of the processing room is depressurized (so-called vacuum condition), and the system is structured in such a manner that a drive apparatus to drive these first arm 61A and the second arm 61B is provided outside processing room, and the boundary is a plate-like portion 62a of ahead portion of the cylindrical hosing 62. The cylindrical housing 62 is structured by the plate-like portion 62a of the head portion and the cylinder portion 62b which is integrally attached with the plate-like portion 62a and protruded to the lower side.

The hollow output axis (outer axis) 21A and the solid output axis (inner axis) 21B which are coaxial with each other, are rotatably supported by bearings 23A and 23B to the cylindrical housing 62. That is, the hollow output axis (outer axis) 21A is rotatably supported by the bearing 23A provided inside the cylinder portion 62b, and the solid output axis (inner axis) 21B is rotatably supported by the bearing 23B provided inside the hollow output axis (outer axis) 21A.

First and second axis seals 63, each constructed by the non-contact type seal such as a magnetic fluid seal or contact type seal, are respectively provided in a gap between the inside of the hollow output axis (outer axis) 21A above the bearing 23B and the outside of the solid output axis (inner axis) 21B, and in a gap between an opening portion formed at the center of the plate-like portion 62a of the cylindrical housing 62 and the outside of the hollow output axis (outer axis) 21A, and the vacuum of the inside of the processing room is maintained.

On the hollow output axis (outer axis) 21A and the solid output axis (inner axis) 21B, the first arm 61A and the second arm 61B to respectively handle the semiconductor wafer or LCD (liquid crystal display) glass base, are fixed by bolts 64A and 64B.

Onto the lower end top portion of the output axis (outer axis) 21A constructed by the hollow cylinder axis, a circumscribed axis 20A is fixed by the bolt 65A. The circumscribed axis 20A is, as shown in FIG. 7A, disk-like, and its central portion is hollow, and the solid output axis (inner axis) 21B can penetrates through it. With the outer peripheral surface of the circumscribed axis 20A, in the embodiment, 3 intermediate axes 30A are in equally contact.

Further, the intermediate axes 30A inscribe the inner surface of the donut-shaped inscribed cylinder 40A. Herein, the sum of the outer diameter of the circumscribed axis 20A and two times of the outer diameter of the intermediate axis 30A is made to be not smaller than the inner diameter of the inscribed cylinder 40A, and the interference is set, and by the interference, the torque adjustment function is provided onto the traction drive speed reducer. In this connection, in the present embodiment, a carrier 10 to rotatably support the intermediate axes 30A is fixed, and to one of the intermediate axes 30A, a front stage speed reducer for drive 50A of the hollow output axis (outer axis) 21A is connected, and further through the front stage speed reducer for drive 50A, the motive power from the outer axis drive motor 70A is transmitted, thereby, the output from the circumscribed axis 20A can be taken out. In this connection, in the intermediate axes, intermediate axes 30A' other than one intermediate axis 30A connected to an outer axis drive motor 70A are shorter than the intermediate axis 30A as shown in FIG. 6B.

Further, onto the lower position of the circumscribed axis 20A below the solid axis output axis (inner axis) 21B, a circumscribed axis attachment mount 66 is connected by a sprain 21Ba, and the circumscribed axis 20B is fixed on the circumscribed axis attachment mount 66 by a bolt 65B. The circumscribed axis 20B is, as shown in FIG. 7B, disk-like and its central portion is hollow, and the lower end portion of the solid output axis (inner axis) 21B can penetrates through it. In the circumscribed axis 20B, a bolt through hole 20Ba to pass through a bolt 65A to fix the circumscribed axis 20A is provided.

Onto the surround of the circumscribed axis 20B, as shown in FIG. 7B, in this embodiment, 3 intermediate axes 30B equally circumscribe, and the circumscribed axis 20B inscribes a donut-shaped inscribed cylinder 40B. Herein, the sum of the outer diameter 20B and two times of the outer diameter of the intermediate axis 30B is made to be larger than the inner diameter of the inscribed cylinder 40B, and the interference is set, and by the interference, the torque adjustment function is provided onto the traction drive speed reducer. In this connection, in the present embodiment, the carrier 10 is fixed, and to one of the intermediate axes 30B, a front stage speed reducer for drive 50B of the solid output axis (inner axis) 21B is connected, and further, through this inner axis front stage speed reducer 50B, the motive power from the inner axis drive motor 70B is transmitted, and thereby, the output can be taken from the circumscribed axis 20B. In this connection, in the intermediate axes, intermediate axes 30B' other than one intermediate axis 30B connected to an outer axis drive motor 70A are shorter than the intermediate axis 30B as shown in FIG. 6B.

In this connection, in FIG. 7A and FIG. 7B, numeral 13 is a column of the carrier to integrally firmly connect the upper and lower plates 11, 12 and 14. In FIG. 7B, the lower end portion of the intermediate axis 30A to drive the hollow cylinder output axis (outer axis) 21A penetrates in the non-contact condition through a gap between the circumscribed axis 20B and the inscribed cylinder 40B.

A shoulder portion 21Aa is formed below the axis seal 63 (that is, the outside of the vacuum processing room) and above the bearing 23A on the hollow output axis (outer axis) 21A, and onto the shoulder portion 21Aa, a code plate 67A of the donut plate-shaped outer axis position detector is fixed by a bolt 68A. Further, on the carrier 10 side of the conveyance apparatus 60, a detector portion 69A of the outer axis position detector is provided, and the code of the code plate 67A is detected and the rotation position of the output axis 21A is detected. The position detector is a magnetic type. The outer axis position detector is arranged between the axis seal 63 and the speed reducer.

On the one hand, onto the lower end top portion 21Bb (that is, the outside of the vacuum processing room) of the solid output axis (inner axis) 21B, a disk-like inner axis position detector 67B is fixed by a bolt 68B, and opposite to the code disk 67B, on the carrier 10 side of the conveyance apparatus 60, as shown in FIG. 6B, a detector portion 69B of the inner axis position detector is provided, and the rotation position of the output axis 21B is detected. This position detector is the magnetic type. The inner axis position detector is positioned in the arrangement space of the drive motors 70A and 70B which are arranged in parallel.

In this embodiment, the outer axis front stage speed reducer 50A and the inner axis front stage speed reducer 50B are respectively traction type speed reducers, and in the speed reducer, the outer axis drive motor 70A and the inner axis drive motor 70B to drive the hollow output axis (outer axis) 21A and the solid output axis (inner axis) 21B are respectively connected to respective circumscribed axes 51. On the outer periphery of this circumscribed axis 51, a plurality of intermediate axes 52 equally circumscribe, and the outside of the intermediate axes 52 inscribes the inscribed cylinder 53. The inscribed cylinder 53 of the speed reducer is fixed and the output is taken from a carrier 54. These outputs of carrier 54 are respectively inputted into the first stage intermediate axes 30A and 30B. In this connection, also in this speed reducer, the sum of the outer diameter of the circumscribed axis 51 and two times of the outer diameter of the intermediate axis 52 is made to be larger than the inner diameter of the inscribed cylinder 53, and the interference is set, and by the interference, the torque adjustment function is provided.

In addition, reference numeral 100 in FIG. 6A designates a third axial seal that is constructed similarly to the axial seal 63 and that is disposed between the outer periphery of the outer axis 21A and the inner periphery of the cylindrical housing 62. Reference numeral 102 in FIGS. 6A and 6B designates a fourth axial seal that is constructed similarly to the axial seal 63 and that is disposed between the outer periphery of the inner axis 21B and the inner periphery of the cylindrical housing 62. The axial seals 100 and 102 define a chamber in which connected portions of the outer and inner axes 21A and 21B to the intermediate axes 30A and 30B and the like are accommodated. The axial seal 100 and the axial seal 63 disposed between the outer periphery of the outer shaft 21A and the inner periphery of the cylindrical housing 62 define a chamber in which the position detector constructed by the detector plate 67A and the detector portion 69A are accommodated. The axial seal 100 isolate these chamber from each other. The position detector constructed by the detector plate 67B and the detector portion 69B is provided to a portion of the inner axis 21B protruded from the axial seal 102 and disposed outside the chamber defined between the axial seals 100 and 102.

In the conveyance apparatus 60 of the present embodiment structured as described above, the motive power inputted from the outer axis drive motor 70A is speed-reduced by the front stage speed reducer 50A, and its output is inputted into the intermediate axis 30A for the outer axis drive of the conveyance apparatus 60. Then, this inputted rotation is speed-reduced by the first stage traction drive speed reducer and rotates the hollow output axis (outer axis) 21A, and drives the first arm 61A attached onto the hollow output axis (onto outer axis) 21A. In the same manner, the rotation force of the inner axis drive motor 70B is inputted into the inner axis front stage speed reducer 50B, and after the predetermined speed reduction is conducted, it is inputted into the intermediate axis 30B of the rear stage inner axis drive speed reducer, and drives the second arm 61B through the solid output axis (inner axis) 21B.

According to the conveyance apparatus of the present embodiment, the following effects can be attained. In the present embodiment, two output axes are coaxially arranged, and the conveyance apparatus is compact. Further, for the speed reduction mechanism of the drive apparatus, because traction system (rolling transmission) or the friction system (friction transmission by the non-metal) which have no gears, is used, the conveyed material such as a wafer can be conveyed without generating the slip (dislocation), and further, because the traction system has no backlash (play) as seen in the gear mechanism, there is no impact by the play at the start of the drive, and the slip (dislocation) of the conveyed material is not caused. Therefore, the compactness, very low vibration, and low noise can be realized.

Further, in the traction system, because there is no gears in the speed reducer, it is conventionally considered that it is inappropriate for the high accurate positioning, however, in the above embodiment, by providing the encoder (code plates 67A, 67B, and the detector portions 69A and 69B of the position detector) on the output side (that is, the hollow output axis (outer axis) 21A and the solid output axis (inner axis) 21B), the problem that it is inappropriate for the high accurate positioning, is solved.

Further, in the conveyance apparatus in the present embodiment, the axis seal 63 constructed by the magnetic fluid seal or contact type seal is provided in the gap between the inside of the hollow output axis (outer axis) 21A above the bearing 23B and the outside of the solid output axis (inner axis) 21B, and in the gap between the opening formed at the center of the plate-like portion 62a of the cylindrical housing 62 and the inside of the hollow output axis (outer axis) 21A, thereby, the vacuum inside the processing room is maintained, and the conveyance apparatus can be used also in both of the vacuum and the air.

Further, in the case of the conveyance apparatus 60 having the speed reducer, because it is mechanically connected from the input to the output, at the time of the conveyance, even when the collision occurs due to any cause, when the torque is within the upper limit value, there is a case where it tries to continue the movement, and it damages the conveyed material or the conveyance apparatus 60, and in the worst case, there is a possibility that the person is nipped and injured. In contrast to this, in the conveyance apparatus of the present embodiment, because the speed reducer having the traction system has no gear, when the torque larger than a predetermined value is activated, because the slip phenomenon is generated inside the traction drive, the impact due to the collision can be absorbed. Further, in the conveyance apparatus of the present embodiment, by adjusting the interference of the outside pressurizing ring (inscribed cylinder), the load torque (torque by which the slip is caused) of the traction drive can be freely set. Further, even when the position dislocation occurs by the slip, as described above, because the encoder is provided on the output side, it can also easily return to the original condition (return to the original point).

In this connection, in the present embodiment, the apparatus having the front stage speed reducers 50A and 50B is described, however, the front stage speed reducers 50A and 50B may be appropriately neglected.

In the present invention, because the position detectors are arranged on the air side, and further, outside the oil lubricant portion of the speed reducer, the two-axis output encoder in the conveyance apparatus can be easily arranged at low cost.

In the present invention, it is preferable that the position detectors of the inner axis and the outer axis are magnetic type. The cost of the magnetic type position detector is lower than that of the optical position detector.

Further, the present invention is the conveyance apparatus of the coaxial two-axis arrangement. The output axis encoder is, in the case of the magnetic type, because there is a possibility that a mis-operation is caused due to the friction powders (iron powders) generated from the speed reducer, it can not be arranged in the oil (the same atmosphere as the speed reducer). Thereby, it is necessary that the output axis encoder is arranged in the air and oil-less atmosphere. However, in the coaxial two axes, the two axes can not be arranged in the same position. It is because, although it is necessary that the receiving side sensor is fixed on the fixed portion, particularly in the inner axis side output axis, the outer axis output axis (rotation axis) exists at the outside, and further the speed reducer also exists there, there is no position to fix it. According to this problem, it is necessary that the axis of the inner axis side encoder is necessarily extended to the opposite direction to the output side, and extended to the fixed position, however, normally, on the reversal side of the output side, there is the speed reducer or motor, and when it is made to be hollow and penetrated, the structure also becomes complicated, thereby, the drive apparatus also can not be compact. (The encoder should be arranged below the motor.) In contrast to this, as in the present invention, when the traction drive structure is applied, the first stage traction drive and the motor can be arranged to be offset, and the first stage traction drive and the motor and the inner axis side output encoder can be arranged in parallel to each other. Thereby, the compactification can be obtained.

Figure 9B:
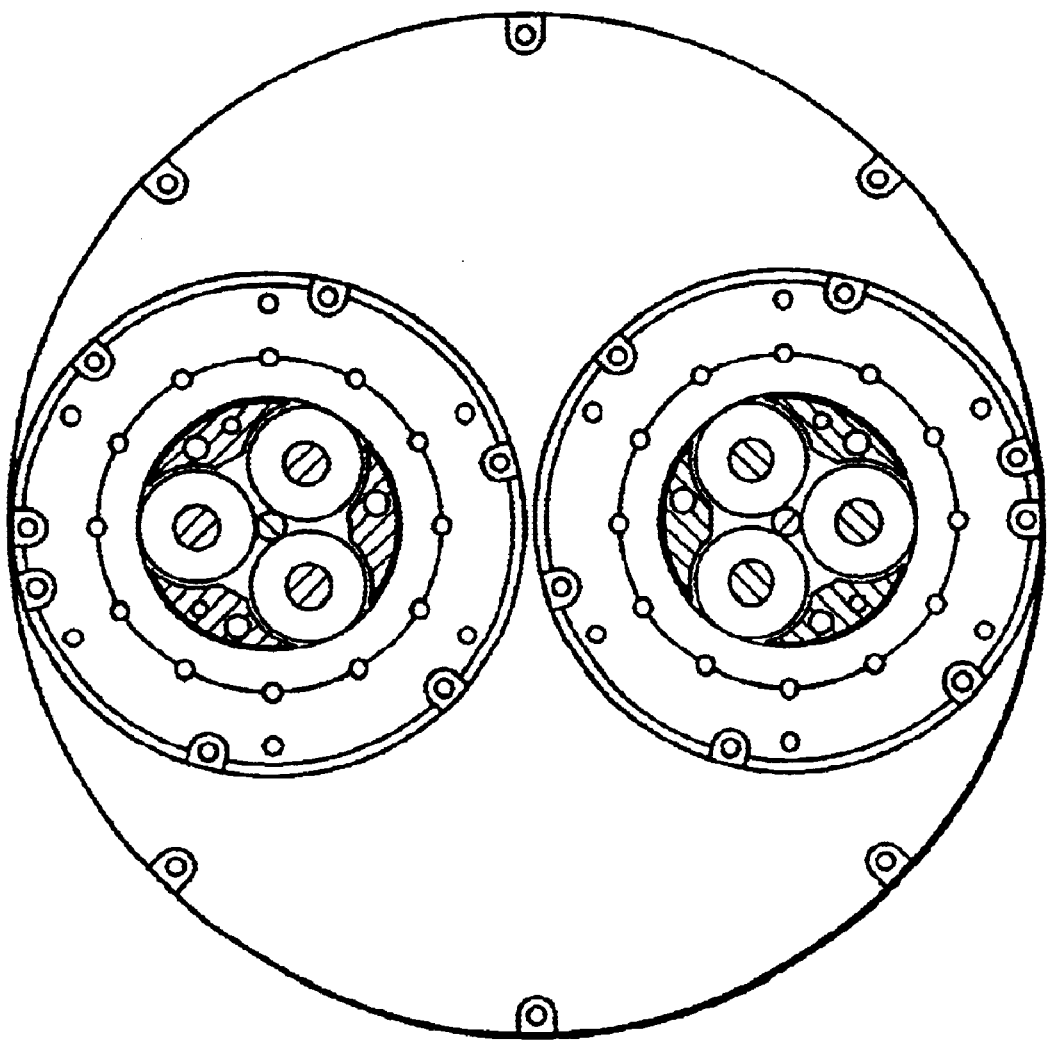

FIG. 9 shows a specified embodiment of yet another conveyance apparatus, and FIG. 9A is a longitudinal sectional view, and FIG. 9B is an A—A sectional view of FIG. 9A.

In the embodiment shown in above FIG. 6 to FIG. 8, the hollow output axis (outer axis) 21A and the solid output axis (inner axis) 21B are coaxial dounle construction, and these hollow output axis (outer axis) 21A and solid output axis (inner axis) 21B are fixed on the circumscribed axes 20A and 20B of the traction dive speed reducer, which is the drive apparatus, by bolts 65A and 65B.

In contrast to this, in the embodiment shown in FIG. 9, although the hollow output axis (outer axis) 21A and the solid output axis (inner axis) 21B are coaxial double construction, these hollow output axis (outer axis) 21A and solid output axis (inner axis) 21B and the output axis (in the embodiment, the carriers 10A and 10B) of the traction drive speed reducer are connected by an endless belt, and for both of hollow output axis (outer axis) 21A and solid output axis (inner axis) 21B, the traction drive speed reducer for the dive of the conveyance apparatus 60 and its front stage speed reducer can be made the same structure.

On the lower end portion of the hollow output axis (outer axis) 21A and solid output axis (inner axis) 21B, pulleys 90A and 90B for the endless belt are integrally provided by the bolt fixing, or sprain connection.

Two groups of traction drive speed reducers 93A and 93B (hereinafter, called the rear stage speed reducer) for the drive of the conveyance apparatus 60, and its front stage speed reducers 50A and 50B and the drive motors 70A and 70B, are prepared for the hollow output axis (outer axis) 21A and solid output axis (inner axis) 21B, and in FIG. 9, these are arranged at the left and right portions of the hollow output axis (outer axis) 21A and solid output axis (inner axis) 21B.

In this connection, the rear stage speed reducers 93A and 93B have the same structure as shown in FIG. 5, and the traction drive speed reducers in which the inscribed cylinders 40A and 40B are fixed, and the input is inputted from the circumscribed axes 20A and 20B and the output is taken from the carriers 10A and 10B, are structured, and the rotation of the drive motors 70A and 70B are reduced, and the output axis 21 which is integrally attached to the carrier 10, is driven. Pulleys 91A and 91B for the endless belt are integrally attached onto the output axes 95A and 95B connected to the carriers 10A and 10B of each of rear stage speed reducers 93A and 93B.

An endless belt 92B is stretched between the pulley 90A for the endless belt formed at the lower end portion of the hollow output axis (outer axis) 21A and a pulley 91B for endless belt formed on the output axis 95B connected to the carrier 10B, and an endless belt 92A is stretched between a pulley 90B for the endless belt formed at the lower end portion of the solid output axis (inner axis) 21B and a pulley 92A for the endless belt formed on the output axis connected to the carrier 10A.

Further, the front stage speed reducers 50A and 50B of the present embodiment have the same structure as the above traction drive sped reducer, and are the traction drive speed reducers of the type in which an inscribed cylinder 53 is fixed, and the rotation of drive motors 70A and 70B is inputted from a circumscribed axis 51, and the output is taken from a carrier 54, and the carrier 54 supports many intermediate axes 55 which circumscribe the circumscribed axis 51, and the circumscribed axis 51 is connected to the output axis of the drive motors 70A and 70B.

The other structures and operations are the same as in the embodiment shown in FIG. 5, or FIG. 6 to FIG. 8, therefore, the explanation will be omitted.

In this connection, in FIG. 9, the position detector (code plates 67a, 67B and detector portions 69A and 69B) (in this connection, in FIG. 9, the detector portion 69B is not shown) are provided on the hollow output axis (outer axis) 21A and the solid output axis (inner axis) 21B, however, in the present embodiment, by applying the pressing force onto the belt pulleys 90A, 90B, 91A and 91B, because the backlash among the endless belts 92A, 92B, and belt pulleys 90A, 90B, 91A and 91B can be removed, the rotation position detector may be provided on each of output axes of the traction drive speed reducers 93A and 93B.

The conveyance apparatus using the traction dive speed reducer for the dive apparatus according to the present invention is a compact, low vibration, and low noise apparatus, and particularly, appropriate as the conveyance apparatus to process the semiconductor wafer or LCD (liquid crystal display) glass base.

What is claimed is:

1. A traction drive speed reducer comprising:
    a first circumscribed friction gear;
    a plurality of first intermediate friction gears contacting an outer periphery of the first circumscribed friction gear;
    a first inscribed cylinder contacting outer peripheries of the first intermediate friction gears;
    a stationary carrier rotatably supporting the first intermediate friction gears; and
    a drive motor connected to at least one of the first intermediate friction gears, wherein rotation inputted by the drive motor is outputted from the first circumscribed friction gear.

2. The traction drive speed reducer according to claim 1, further comprising:
    a hollow, second circumscribed friction gear arranged coaxially with respect to the first circumscribed friction gear;
    a plurality of second intermediate friction gears contacting an outer periphery of the second circumscribed friction gear;
    a second inscribed cylinder contacting outer peripheries of the second intermediate friction gears;
    a second stationary carrier rotatably supporting the second intermediate friction gears; and
    a second drive motor connected to at least one of the second intermediate friction gears, wherein rotation inputted by the second drive motor is outputted from the second circumscribed friction gear.

3. The traction drive speed reducer according to claim 1, further including:
    a drive arm connected to the first circumscribed friction gear; and
    a conveyance table connected to a distal end of the drive arm.

4. The traction drive speed reducer according to claim 2, further including:
    first and second drive arms respectively connected to the first and second circumscribed friction gears;
    first and second conveyance tables connected to distal ends of the first and second drive arms, respectively.

5. The traction drive speed reducer according to claim 2, further including:
    a cylindrical housing rotatably supporting the first and second circumscribed friction gears, and accommodating therein at least portions of the first and second intermediate ears where the intermediate friction gears contact the first and second circumscribed friction gears and the first and second inscribed cylinders;
    a first seal between the first circumscribed friction gear and the second circumscribed friction gear;
    a second seal between the second circumscribed friction gear and the cylindrical housing;
    a third seal between the second circumscribed friction gear and the cylindrical housing at a location different from the second seal;
    a fourth seal between the first circumscribed friction gear and the cylindrical housing;
    a first chamber, defined by the first, third and fourth seals within the cylindrical housing, for accommodating the at least portions of the first and second intermediate friction gears;
    a second chamber, defined by the second and third seals between the cylindrical housing and the second circumscribed friction gear;
    a first position detector provided to a portion of the first circumscribed friction gear protruded from the fourth seal, and located outside the first chamber; and
    a second position detector provided to a portion of the second circumscribed friction gear and located within the second chamber.

6. A traction drive speed reducer which comprises a circumscribed friction gear, a plurality of intermediate friction gears arranged contacting an outer periphery of the circumscribed friction gear, and an inscribed cylinder inscribing outer peripheries of the intermediate friction gears, wherein:
    a supporting member for rotatably supporting the intermediate friction gears is fixed;
    a drive motor is connected to at least one of the plurality of intermediate friction gears; and
    an output is taken from the circumscribed friction gear having a larger diameter than the outer diameter of the intermediate friction gears.

7. A traction drive speed reducer which comprises a circumscribed friction gear, a plurality of intermediate friction gears arranged contacting around an outer periphery of the circumscribed friction gear, and an inscribed cylinder inscribing outer peripheries of the intermediate friction gears, wherein:
    two or more circumscribed friction gears are arranged coaxially;
    the plurality of intermediate friction gears forms sets corresponding to the circumscribed friction gears so that the intermediate friction gears in each set are arranged contacting around an outer periphery of a corresponding one of the circumscribed friction gears;
    a supporting member for rotatably supporting the intermediate friction gears is fixed; and
    rotation is imputed into at least one of intermediate friction gears of each set so that output is taken from the corresponding circumscribed friction gear, thereby obtaining two or more coaxial outputs.

8. A conveyance apparatus comprising a drive motor and a drive arm driven by the drive motor, and a conveyance table connected to a front end of the drive arm, wherein:
    output from the drive motor is transmitted to the drive arm through a traction drive speed reducer comprising a circumscribed friction gear, a plurality of intermediate friction gears arranged around an outer periphery of the circumscribed friction gear, and an inscribed cylinder inscribing outer peripheries of the intermediate friction gears.

9. The conveyance apparatus according to claim 8, wherein the conveyance apparatus has two coaxially arranged output axes, and each of the output axes is connected to a corresponding drive motor through the traction drive speed reducer comprising circumscribed friction gears, a plurality of intermediate friction gears arranged around the outer peripheries of the circumscribed friction gears, and inscribed cylinders inscribing outer peripheries of the intermediate friction gears, and two coaxial outputs can be taken from the two output axes.

10. The conveyance apparatus according to claim 8, wherein a front stage speed reducer is connected to a front stage of the traction drive speed reducer, and the front stage speed reducer is constructed by a traction drive speed reducer comprising a circumscribed friction gear, a plurality of intermediate friction gears arranged contacting around an outer periphery of the circumscribed friction gear, and an inscribed cylinder inscribing outer peripheries of the intermediate friction gears.

11. The conveyance apparatus according to claim 8, wherein a position detector is provided on an output side of the traction drive speed reducer.

12. The conveyance apparatus according to claim 11, wherein an interference is set by making the sum of an outer diameter of the circumscribed friction gear and two times of an outer diameter of the intermediate friction gear, to be not smaller than an inner diameter of the inscribed cylinder, so that torque adjusting function is provided by the interference.

13. In a conveyance apparatus for conveying a material to be conveyed by independently driven driving motors which are connected to respective output axes coaxially arranged as an inner axis and a hollow outer axis, a 2-axis output encoder is arranged so that:

axis seals exist between the inner axis and the outer axis, and between the outer axis and a cylindrical housing;

a traction drive speed reducer, having the driving motors, circumscribed friction gears, intermediate friction gears and inscribed cylinders, for speed-reducing the rotation of the drive motors, the traction drive speed reducer being arranged on an air side of the conveyance apparatus; and a position detector for the inner axis penetrates through the speed reducer, and a position detector for the outer axis is arranged among the axis seals and the speed reducer, the position detectors being provided on the air side.

14. The conveyance apparatus according to claim 13, wherein the drive motor for the inner friction gear and the drive motor for the outer friction gear are parallelly arranged, and the position detector for the inner friction gear exists in an arrangement space of the motors.

15. A traction drive speed reducer comprising:

a first circumscribed gear;

a plurality of first intermediate gears contacting an outer periphery of the first circumscribed gear;

a first inscribed cylinder contacting outer peripheries of the first intermediate gears;

a stationary carrier rotatably supporting the first intermediate gears; and a drive motor connected to at least one of the first intermediate gears, wherein rotation inputted by the drive motor is outputted from the first circumscribed gear.

* * * * *